(12) United States Patent
Rao et al.

(10) Patent No.: US 8,962,782 B2
(45) Date of Patent: Feb. 24, 2015

(54) PERFLUOROETHER SEALANT COMPOSITIONS

(71) Applicant: PRC-DeSoto International, Inc., Sylmar, CA (US)

(72) Inventors: Chandra Rao, Valencia, CA (US); Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/200,849

(22) Filed: Mar. 7, 2014

(65) Prior Publication Data

US 2014/0187735 A1 Jul. 3, 2014

Related U.S. Application Data

(62) Division of application No. 13/561,202, filed on Jul. 30, 2012.

(51) Int. Cl.
| | | |
|---|---|---|
| *C09K 3/10* | (2006.01) | |
| *C08G 77/46* | (2006.01) | |
| *C08G 65/00* | (2006.01) | |
| *C08G 65/336* | (2006.01) | |
| *C08G 77/50* | (2006.01) | |
| *C08L 101/10* | (2006.01) | |

(52) U.S. Cl.
CPC ............ *C09K 3/1018* (2013.01); *C08G 65/007* (2013.01); *C08G 65/336* (2013.01); *C08G 77/46* (2013.01); *C08G 77/50* (2013.01); *C08L 101/10* (2013.01)
USPC ............................................ 528/36; 156/329

(58) Field of Classification Search
None
See application file for complete search history.

(56) References Cited

U.S. PATENT DOCUMENTS

| | | | |
|---|---|---|---|
| 4,987,267 A | 1/1991 | Takaoka et al. | |
| 5,262,557 A | 11/1993 | Kishita et al. | |
| 5,270,364 A | 12/1993 | Schwartz et al. | |
| 5,284,888 A | 2/1994 | Morgan | |
| 5,288,829 A * | 2/1994 | Takago et al. | 528/15 |
| 5,380,811 A * | 1/1995 | Kishita et al. | 528/15 |
| 5,475,078 A | 12/1995 | Sato et al. | |
| 5,530,060 A | 6/1996 | Fujiki et al. | |
| 6,040,400 A * | 3/2000 | Fukuda et al. | 526/126 |
| 6,184,280 B1 | 2/2001 | Shibuta | |
| 6,417,311 B1 | 7/2002 | Fukuda et al. | |
| 6,517,946 B2 | 2/2003 | Shiono et al. | |
| 6,525,168 B2 | 2/2003 | Zook et al. | |
| 6,673,876 B2 * | 1/2004 | Fukuda et al. | 525/478 |
| 6,784,306 B2 * | 8/2004 | Fukuda et al. | 556/434 |
| 6,815,492 B2 * | 11/2004 | Sato et al. | 524/588 |
| 6,844,632 B2 * | 1/2005 | Shiono et al. | 257/788 |
| 7,601,428 B2 | 10/2009 | Yamane et al. | |
| 7,794,843 B2 | 9/2010 | Yamane et al. | |
| 7,829,649 B2 | 11/2010 | Yamane et al. | |
| 7,868,119 B2 | 1/2011 | Shiono et al. | |
| 8,513,339 B1 | 8/2013 | Keledjian et al. | |
| 2007/0149746 A1 * | 6/2007 | Yamane et al. | 528/42 |
| 2008/0050600 A1 | 2/2008 | Fan et al. | |
| 2008/0071042 A1 * | 3/2008 | Yamane et al. | 525/474 |
| 2009/0197090 A1 | 8/2009 | Hahn et al. | |
| 2010/0029889 A1 * | 2/2010 | Yamane et al. | 528/25 |
| 2010/0124664 A1 * | 5/2010 | Mogi | 428/447 |
| 2011/0257315 A1 | 10/2011 | Shiono et al. | |
| 2012/0077041 A1 | 3/2012 | Yamane et al. | |

FOREIGN PATENT DOCUMENTS

| | | |
|---|---|---|
| EP | 2187262 | 5/2010 |
| JP | 2003238577 | 8/2003 |

OTHER PUBLICATIONS

Koshikawa et al., "Perfluoroether Elastomer for Wide Fluid and Temperature Capabilities," Oilfield Engineering with Polymers 2006' organized by MERL and Rapra Technology, Sealing Technology, Jun. 2006, p. 7-12.

Wu et al., "Phenoxide Allylation in a Phase-transfer Catalytic Extraction System", Ind. Eng. Chem. Res., 1995, 34 (5) 1536-11538.

* cited by examiner

*Primary Examiner* — Robert S Loewe

(74) *Attorney, Agent, or Firm* — William R. Lambert

(57) ABSTRACT

Disclosed are perfluoroethers and perfluoroether compositions useful in high temperature aerospace applications. The perfluoroethers can be adapted for use with various curing chemistries.

17 Claims, No Drawings

PERFLUOROETHER SEALANT COMPOSITIONS

CROSS-REFERENCE TO RELATED APPLICATION

This application is a divisional application of U.S. patent application Ser. No. 13/561,202 filed Jul. 30, 2012, entitled: "PERFLUOROETHER SEALANT COMPOSITIONS", which is incorporated by reference in its entirety.

FIELD

This disclosure relates to perfluoroethers and perfluoroether compositions useful in high temperature aerospace sealant applications.

BACKGROUND

Electrically conductive sealants are widely used in the aerospace industry to seal gaps between two panels where electrical conductivity is required. However, maintaining electrical conductivity after exposure to high temperature, such as 500° F. for 24 hours, remains an unmet need. Fluoropolymers, such as perfluoroethers, have been developed that exhibit high temperature stability. Perfluoroethers are useful for high temperature applications and the terminal groups may be adapted for various curing chemistries. However, to meet the demanding performance requirements of the aerospace industry, especially in applications in which high electrical conductivity is required, perfluoroether compositions must be carefully tailored.

SUMMARY

To provide sealants meeting the demanding environmental, thermal, chemical, and electrical requirements of aerospace applications, addition- and moisture-curable sealant compositions containing modified polymeric perfluoroethers are disclosed. Perfluoroethers provided by the present disclosure have been extended using siloxanes to increase the molecular weight of the perfluoroethers. The terminal groups have also been modified to include hydrosilane groups appropriate for use with addition curing, or with alkoxysilane groups useful for moisture curing. Addition-curable and moisture-curable compositions are provided having a combination of perfluoroethers including extended perfluoroethers. Such compositions are particularly useful in electrically conductive sealants.

In a first aspect, moisture-curable compositions comprising an alkoxysilane-terminated extended perfluoroether are disclosed.

In a second aspect, moisture-curable compositions are disclosed comprising the reaction products of reactants comprising: (a) an unextended alkenyl-terminated perfluoroether; (b) a hydrosilane-terminated siloxane; and (c) an alkoxysilane.

In a third aspect, moisture-curable compositions are disclosed prepared by steps comprising: (a) reacting an unextended alkenyl-terminated perfluoroether and a hydrosilane-terminated siloxane to provide a mixture of alkenyl-terminated extended perfluoroethers and unextended alkenyl-terminated perfluoroethers; and (b) reacting the mixture with an alkoxysilane to provide a mixture of alkoxysilane-terminated extended perfluoroethers and unextended alkoxysilane-terminated perfluoroethers.

In a fourth aspect, addition-curable compositions comprising (a) an alkenyl-terminated perfluoroether; and (b) a hydrosilane-terminated extended perfluoroether are disclosed.

In a fifth aspect, addition-curable compositions are disclosed comprising the reaction products of reactants comprising: (a) an alkenyl-terminated perfluoroether; (b) a first hydrosilane-terminated siloxane; and (c) a second hydrosilane-terminated siloxane.

In a sixth aspect, addition-curable compositions are disclosed prepared by steps comprising: (a) reacting an unextended alkenyl-terminated perfluoroether and a first hydrosilane-terminated siloxane to provide a mixture of alkenyl-terminated extended perfluoroethers and unextended alkenyl-terminated perfluoroethers; and (b) reacting the mixture with a second hydrosilane-terminated siloxane to provide a mixture of hydrosilane-terminated extended perfluoroethers and unextended hydrosilane-terminated perfluoroethers.

In a seventh aspect, cured sealants comprising a composition provided by the present disclosure are disclosed.

In an eighth aspect, apertures sealed with a composition provided by the present disclosure are disclosed.

In a ninth aspect, methods of sealing an aperture are disclosed, comprising (a) applying a composition provided by the present disclosure to one or more surfaces defining an aperture; (b) assembling the surfaces defining the aperture; and (c) curing the composition to seal the aperture.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —CONH$_2$ is bonded to another chemical moiety through the carbon atom.

"Alkenyl" refers to a group —CH=CH$_2$.

"Alkoxysilane" refers to a compound of Formula (4) or a group of Formula (4a):

$$H—Si(—R^3)_p(—OR^3)_{3-p} \quad (4)$$

$$—Si(—R^3)_p(—OR^3)_{3-p} \quad (4a)$$

where p is selected from 0, 1, and 2; and each $R^3$ is independently selected from $C_{1-4}$ alkyl. In certain embodiments of a compound of Formula (4) and a group of Formula (4a), p is 0, p is 1, and in certain embodiments, p is 2. In certain embodiments of a compound of Formula (4) and a group of Formula (4a), each $R^3$ is independently selected from ethyl and methyl. In certain embodiments of a compound of Formula (4) and a group of Formula (4a), each $R^3$ is ethyl, and in certain embodiments, each $R^3$ is methyl.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, $C_{1-3}$ alkyl, and in certain embodiments, $C_{1-2}$ alkyl.

"Siloxane" refers to compounds or moieties having alternating silicon and oxygen atoms such as —Si(R)$_2$—O—Si(R)$_2$— where each R can be, for example, alkyl, cycloalkyl, alkoxysilane, aryl, and others. In certain embodiments, a siloxane comprises the structure of Formula (2a), Formula (2b), or Formula (2c):

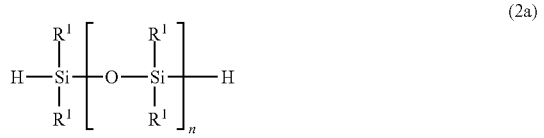

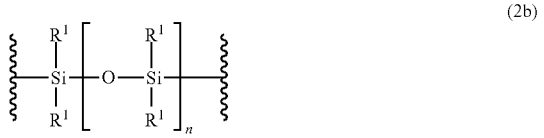

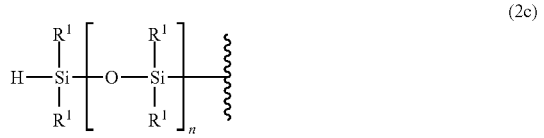

where each $R^1$ is independently selected from $C_{1-4}$ alkyl, $C_{5-6}$ cycloalkyl, phenyl, and —O—Si($R^2$)$_{3-m}$(H)$_m$ or —O—Si($R^2$)$_3$, where each $R^2$ is independently $C_{1-4}$ alkyl, m is selected from 0, 1, and 2; and n is an integer from 1 to 6. Siloxanes of Formula (2a) and Formula (2c), and siloxanes of Formula (2b) in which at least one $R^2$ is —O—Si($R^2$)$_{3-m}$(H)$_m$ and m is 1 or 2 are referred to hydrosilane-terminated siloxanes. In certain embodiments of siloxanes of Formula (2a) and Formula (2b), each $R^1$ is independently selected from $C_{1-4}$ alkyl, $C_{5-6}$ cycloalkyl, phenyl, and —O—Si($R^2$)$_3$, wherein each $R^2$ is independently $C_{1-4}$ alkyl; and n is an integer from 1 to 6.

A siloxane may also be cyclic and, for example, and may have the structure,

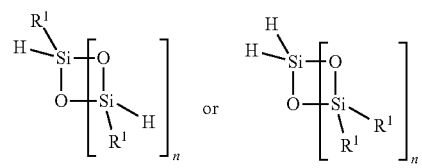

where each $R^1$ can be, for example, hydrogen, alkyl, cycloalkyl, —O—Si($R^2$)$_{3-m}$(H)$_m$, aryl, and others, and n can be 1, 2, 3, 4, or an integer greater than 4. An example of a cyclic siloxane is tetramethylcyclotetrasiloxane (TMCTS). Cyclic siloxanes having at least one hydrosilane group are referred to as hydrosilane-terminated siloxanes.

As can be appreciated, siloxanes also include alicyclic siloxanes having both linear and cyclic siloxane structures.

Siloxanes also include aliphatic siloxanes, e.g., siloxanes of Formula (2a), Formula (2b), and Formula (2c) in which each $R^1$ is selected from hydrogen and $C_{1-4}$ alkyl. In certain embodiments of an aliphatic siloxane, each $R^1$ is selected from hydrogen, $C_{1-4}$ alkyl, $C_{3-6}$ cycloalkyl, and phenyl.

"Hydrosilane" refers to a group having at least one hydrogen bonded to a silicon atom such as, for example, —SiH$_3$, —Si(—R)H$_2$, and —Si(—R)$_2$H, where each R is a group other than hydrogen such as, for example, a $C_{1-4}$ alkyl, $C_{5-6}$ cycloalkyl, phenyl, or —O—Si($R^2$)$_{3-m}$(H)$_m$, where each $R^2$ is independently $C_{1-4}$ alkyl; and m is selected from 0, 1, and 2. In certain embodiments, a hydrosilane group refers to a —Si(R)$_2$H group. In certain embodiments, a hydrosilane group is a —Si(R)$_2$H group wherein each R is independently selected from $C_{1-4}$ alkyl, $C_{5-6}$ cycloalkyl, phenyl, and a —O—Si($R^2$)$_{3-m}$(H)$_m$, where each $R^2$ is independently $C_{1-4}$ alkyl; and m is selected from 0, 1, and 2. A hydrosilane-terminated compound, moiety, or group, refers to a compound, moiety, or group having a hydrosilane group. A hydrosilane-terminated siloxane refers to a siloxane having one or more hydrosilane groups such as, for example, siloxanes of Formula (2a), and Formula (2c), and compounds of Formula (2b) where at least one $R^1$ is —O—Si($R^2$)$_{3-m}$(H)$_m$ and m is 1 or 2.

Reference is now made to certain embodiments of compounds, polymers, compositions, and methods. The disclosed embodiments are not intended to be limiting of the claims. To the contrary, the claims are intended to cover all alternatives, modifications, and equivalents.

Perfluoroethers

Perfluoroethers are known to be useful in applications requiring high temperature stability. Perfluoroether polymers are available, for example, from suppliers such as Daikin (Demnum®), Solvay (Fomblin®), and Shin-Etsu (Sifel®). In general, certain perfluoroether polymers are characterized by a backbone containing multiple perfluoroether —CF$_2$—O— units, such as, for example, —(CF$_2$—CF$_2$—CF$_2$—O)$_k$— (Demnum®), —(CF$_2$—CF$_2$—O)$_k$—(CF$_2$—O)$_m$— (Fomblin®), and —(CF(CF$_3$)—CF$_2$—O)$_k$— or —CF$_2$—CF$_2$(CF$_3$)—O)$_k$— (Sifel®) perfluoroether groups. In certain embodiments, a perfluoroether comprises a perfluoroether group selected from —[—CF$_2$—O—]$_k$—; —[—CF(CF$_3$)—O—]$_k$—; —[—CF$_2$—CF$_2$—O—]$_k$—; —[—CF(CF$_3$)—

—CF$_2$—O—]$_k$—; —[—CF$_2$—CF(CF$_3$)—O—]$_k$—; —[—CF$_2$—CF$_2$—CF$_2$—O]$_k$—; —[—CF(CF$_3$)—CF$_2$—CF$_2$—O—]$_k$—; —[—CF$_2$—CF(CF$_3$)—CF$_2$—O—]$_k$—; —[—CF$_2$—CF$_2$—CF(CF$_3$)—O—]$_k$—; —CF$_2$—O—[—CF$_2$—CF$_2$—O—]$_k$—[—CF$_2$—O—]$_k$—CF$_2$—; —CF$_2$—O—[—CF(CF$_3$)—CF$_2$—O—]$_k$—[—CF$_2$—O—]$_k$—CF$_2$—; —CF$_2$—O—[—CF$_2$—CF(CF$_3$)—O—]$_k$—[—CF$_2$—O—]$_k$—CF$_2$—; and a combination of any of the foregoing. In certain embodiments, k is an integer from 2 to 100, from 5 to 80, from 10 to 60, and in certain embodiments, from 15 to 60. In certain embodiments, the total number of perfluoroether groups including any of those described herein, either individually or in combination, may be from 2 to 100, from 5 to 80, from 10 to 60, and in certain embodiments, from 15 to 60. In certain embodiments, a perfluoroether has a number average molecular weight from 500 Daltons to 15,000 Daltons, from 1,000 Daltons to 12,000 Daltons, from 1,500 Daltons to 10,000 Daltons, and in certain embodiments, from 2,000 Daltons to 8,000 Daltons.

Extended perfluoroethers provided by the present disclosure comprise about twice the number perfluoroether groups as the corresponding unextended perfluoroether, such as, for example, from 2 to 300, from 10 to 250, from 30 to 200, from 50 to 150, and in certain embodiments, from 100 to 150. In certain embodiments, a extended perfluoroethers have a number average molecular weight from 1,000 Daltons to 40,000 Daltons, from 2,000 Daltons to 30,000 Daltons, from 5,000 Daltons to 25,000 Daltons, and in certain embodiments, from 10,000 Daltons to 25,000 Daltons.

In certain embodiments, an alkenyl-terminated perfluoroether comprises perfluoroether groups selected from —[—CF$_2$—CF$_2$—CF$_2$—O—]$_k$—, —CF$_2$—O—[—CF$_2$—CF$_2$—O—]$_k$—[—CF$_2$—O—]$_k$—CF$_2$—, —[—CF(CF$_3$)—CF$_2$—O—]$_k$—, —[—CF$_2$—CF(CF$_3$)—O—]$_k$—, and a combination of any of the foregoing, and in certain embodiments, each k is independently an integer from 2 to 100.

In certain embodiments, a perfluoroether comprises perfluoroether groups having the structure —[—CF(CF$_3$)—CF$_2$—O—]$_k$— where k is an integer from 2 to 200, from 10 to 180, from 20, to 160, from 50 to 150, and in certain embodiments, from 100 to 150.

In certain embodiments, a perfluoroether comprises perfluoroether groups having the structure —[—CF$_2$—CF(CF$_3$)—O—]$_k$— where k is an integer from 2 to 200, from 10 to 180, from 20, to 160, from 50 to 150, and in certain embodiments, from 100 to 150.

In certain embodiments, a perfluoroether comprises an alkenyl-terminated perfluoroether. In certain embodiments an alkenyl-terminated perfluoroether has an average alkenyl functionality from 2 to 6, and in certain embodiments, from 2 to 3. In certain embodiments, an alkenyl-terminated perfluoroether is difunctional. In certain embodiments, polyfunctional alkenyl-terminated perfluoroethers may be prepared by reacting a difunctional alkenyl-terminated perfluoroether with a polyfunctional hydrosilane. Examples of polyfunctional hydrosilanes include alkylsilanes such as ethylsilane and others such as phenyltris(dimethylsilyl)silane. Reacting, for example, a difunctional alkenyl-terminated perfluoroether and a polyfunctional alkylsilane R—SiH$_3$ where R is alkyl, in a 3:1 equivalent ratio can provide a trifunctional alkyl-terminated perfluoroether. It can be appreciated that alkenyl-terminated perfluoroethers having various alkenyl functionality, ranges of functionality, and/or average alkenyl functionality may be prepared.

In certain embodiments, a perfluoroether includes segments in addition to perfluoroether —CF$_2$—O— units, including any of the perfluoroether groups disclosed herein.

The additional segments may be situated at any location within the backbone structure such as, for example, separating segments containing multiple perfluoroether groups or between the perfluoroether backbone and an end group or terminal group. Using one of the perfluoroether segments as an example, a perfluoroether having one or more additional segments may include backbone regions having the structure -L-[—CF$_2$—O—]$_k$—, -L-[—CF$_2$—O—]$_k$-L-, -L-[—CF$_2$—O—]$_k$-L-[—CF$_2$—O—]$_k$—, and/or others, where -L- represents the additional segment. The one or more additional segment may include, for example, alkanediyl groups, cycloalkanediyl groups, arene-diyl groups, amine-diyl, silane-diyl, and combinations of any of the foregoing, which may be unsubstituted or substituted where the substituents may be, for example, alkyl, amine, hydroxy, =O, or alkoxy.

Thus, as used herein, -PFE- refers to the core of the perfluoroether and comprises at least one perfluoroether segment or segments, -PFE$_S$-, where each perfluoroether segment comprises perfluoroether groups, and any additional non-perfluoroether segments -L- such as, for example, -L-PFE$_S$-L-. The perfluoroether core -PFE- may be terminated with a functional group such as an alkenyl group or other functional group.

In certain embodiments, a perfluoroether is a difunctional perfluoroether. In certain embodiments, a difunctional alkenyl-terminated perfluoroether has the structure CH$_2$=CH—PFE-CH=CH$_2$, wherein -PFE- comprises multiple perfluoroether groups and any non-perfluoroether segments. In certain embodiments, a difunctional alkenyl-terminated perfluoroether has the structure CH$_2$=CH-L-PFE$_S$-L-CH=CH$_2$, where L is defined herein.

Extended Perfluoroethers

In certain embodiments of compositions provided by the present disclosure, a composition comprises an extended perfluoroether.

An extended perfluoroether refers to a perfluoroether resulting from the reaction of a lower molecular weight perfluoroether with an extending group. Extension of prepolymers to form higher molecular weight polymers is well-known and can be controlled at least in part by selection of the ratio of functional groups of the reactants. In certain embodiments, an extended perfluoroether comprises two precursor perfluoroethers, three precursor perfluoroethers, four precursor perfluoroethers, and in certain embodiments, more than four precursor perfluoroethers. In certain embodiments, an extending group is a siloxane. Use of certain siloxanes as extending groups may also be useful to impart additional hydrosilane functionality as useful for addition curing (hydrosilylation) reactions.

In certain embodiments, an extended perfluoroether comprises terminal groups selected from alkenyl groups, hydrosilane groups, hydrosilane-terminated siloxane groups, and alkoxysilane groups. In certain embodiments, an extended perfluoroether comprises terminal alkenyl groups, in certain embodiments, terminal siloxane groups, terminal hydrosilane-terminated siloxane groups, and in certain embodiments, terminal alkoxysilane groups.

In certain embodiments, an alkenyl-terminated extended perfluoroether has the structure of Formula (1):

CH$_2$=CH-PFE-CH$_2$—CH$_2$-A'-CH$_2$—CH$_2$-PFE-CH=CH$_2$     (1)

wherein -A'- has the structure:

where each $R^1$ is independently selected from $C_{1-4}$ alkyl, $C_{5-6}$ cycloalkyl, phenyl, and —O—Si$(R^2)_{3-m}$(H)$_m$ or —O—Si$(R^2)_3$, where each $R^2$ is independently $C_{1-4}$ alkyl, m is selected from 0, 1, and 2; and n is an integer from 1 to 6; and each —CH$_2$—CH$_2$-PFE-CH$_2$—CH$_2$— is derived from an alkenyl-terminated perfluoroether, CH$_2$═CH-PFE-CH═CH$_2$, where -PFE- comprises perfluoroether groups.

In certain embodiments of Formula (2b), n is 1, n is 2, n is 3, n is 4, n is 5, and in certain embodiments, n is 6.

In certain embodiments of Formula (2b), each $R^1$ is independently selected from $C_{1-2}$ alkyl, phenyl, and —O—Si$(R^3)_3$. In certain embodiments of Formula (2b), each $R^1$ is independently selected from $C_{1-2}$ alkyl, phenyl, and —O—Si$(R^3)_3$, where each $R^3$ is independently selected from $C_{1-2}$ alkyl. In certain embodiments of Formula (2b), each $R^1$ is independently selected from $C_{1-2}$ alkyl, phenyl, and —OSi(CH$_3$)$_3$. In certain embodiments of Formula (2b), n is selected from 1 and 2; and each $R^1$ is independently selected from $C_{1-2}$ alkyl, phenyl, and —OSi(CH$_3$)$_3$.

In certain embodiments of Formula (2b), each $R^1$ is independently selected from $C_{1-2}$ alkyl, phenyl, —OSi(CH$_3$)$_2$H, and —OSi(CH$_3$)$_3$. In certain embodiments of Formula (2b), n is selected from 1 and 2; and each $R^1$ is independently selected from $C_{1-2}$ alkyl, phenyl, —OSi(CH$_3$)$_2$H, and —OSi(CH$_3$)$_3$. In certain embodiments, n is selected from 1 and 2; and each $R^1$ is independently selected from —CH$_3$ and —OSi(CH$_3$)$_2$H.

In certain embodiments of Formula (2b), each $R^1$ is independently selected from $C_{1-4}$ alkyl, $C_{5-6}$ cycloalkyl, phenyl, and —O—Si$(R^2)_3$, wherein each $R^2$ is independently $C_{1-4}$ alkyl; and n is an integer from 1 to 6.

In certain embodiments of a hydrosilane-terminated siloxane of Formula (2b), each $R^1$ is the same and in certain embodiments, at least one $R^1$ is different. In certain embodiments, each $R^1$ is selected from methyl, ethyl, n-propyl, iso-propyl, n-butyl, iso-butyl, and tert-butyl. In certain embodiments, each $R^1$ is selected from methyl and ethyl. In certain embodiments, each $R^1$ is methyl.

Extended perfluoroethers suitable for moisture-curable compositions do not contain terminal hydrosilane groups, such that $R^1$ is —O—Si$(R^2)_3$.

In certain embodiments, an alkenyl-terminated extended perfluoroether comprises the reaction products of reactants comprising: (a) an unextended alkenyl-terminated perfluoroether; and (b) a hydrosilane-terminated siloxane.

An alkenyl-terminated perfluoroether may comprise any of the perfluoroether groups disclosed herein and in certain embodiments, an unextended alkenyl-terminated perfluoroether comprises perfluoroether groups selected from —[—CF$_2$—CF$_2$—CF$_2$—O]$_k$—, —CF$_2$—O—[—CF$_2$—CF$_2$—O—]$_k$—[—CF$_2$—O—]$_k$—CF$_2$—, —[—CF(CF$_3$)—CF$_2$—O—]$_k$—, —[—CF$_2$—CF(CF$_3$)—O—]$_k$— and a combination of any of the foregoing.

An unextended alkenyl-terminated perfluoroether such as an unextended alkenyl-terminated perfluoroether of the formula CH$_2$═CH-PFE-CH═CH$_2$ may be a commercially available perfluoroether such as a perfluoroether available from Daikin, Solvay, Shin-Etsu, and others, or may be derived from a commercially available perfluoroether that does not have terminal alkenyl groups.

In certain embodiments, an unextended alkenyl-terminated perfluoroether has a number-average molecular weight from 2,000 Daltons to 15,000 Daltons, from 4,000 Daltons to 13,000 Daltons, from 5,000 Daltons to 12,000 Daltons, from 6,000 Daltons to 11,000 Daltons, from 7,000 Daltons to 10,000 Daltons, and in certain embodiments, from 8,000 Daltons to 9,000 Daltons. In certain embodiments, an unextended alkenyl-terminated perfluoroether is liquid at room temperature. In certain embodiments, an unextended alkenyl-terminated perfluoroether has a viscosity from 80 poise to 400 poise, from 90 poise to 300 poise, from 100 poise to 200 poise, and in certain embodiments, from 110 poise to 150 poise, at 25° C. In certain embodiments, an unextended alkenyl-terminated perfluoroether has a viscosity from 0.2 poise to 400 poise, from 0.5 poise to 300 poise, from 1 poise to 200 poise, and in certain embodiments, from 1 poise to 150 poise, at 25° C. In certain embodiments, an unextended alkenyl-terminated perfluoroether is difunctional.

In certain embodiments, a hydrosilane-terminated siloxane has the structure of Formula (2a):

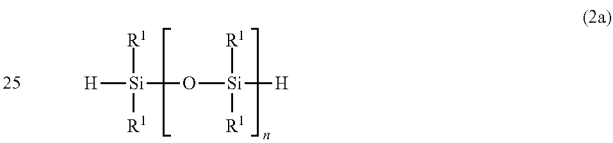

where each $R^1$ is independently selected from $C_{1-4}$ alkyl, $C_{5-6}$ cycloalkyl, phenyl, and —O—Si$(R^2)_{3-m}$(H)$_m$ or —O—Si$(R^2)_3$, where each $R^2$ is independently $C_{1-4}$ alkyl, and m is selected from 0, 1, and 2; and n is an integer from 1 to 6.

In certain embodiments of Formula (2a), n is 1, n is 2, n is 3, n is 4, n is 5, and in certain embodiments, n is 6.

In certain embodiments of Formula (2a), each $R^1$ is independently selected from $C_{1-2}$ alkyl, phenyl, and —O—Si$(R^2)_{3-m}$(H)$_m$. In certain embodiments of Formula (2a), each $R^1$ is independently selected from $C_{1-2}$ alkyl, phenyl, and —O—Si$(R^2)_{3-m}$(H)$_m$, where each $R^2$ is independently selected from $C_{1-2}$ alkyl, and m is selected from 0 and 1. In certain embodiments of Formula (2a), each $R^1$ is independently selected from $C_{1-2}$ alkyl, phenyl, and —OSi(CH$_3$)$_3$. In certain embodiments of Formula (2a), n is selected from 1 and 2; and each $R^1$ is independently selected from $C_{1-2}$ alkyl, phenyl, and —OSi(CH$_3$)$_3$.

In certain embodiments of Formula (2a), each $R^1$ is independently selected from $C_{1-2}$ alkyl, phenyl, and —OSi(CH$_3$)$_2$H and —OSi(CH$_3$)$_3$. In certain embodiments of Formula (2a), n is selected from 1 and 2; and each $R^1$ is independently selected from $C_{1-2}$ alkyl, phenyl, and —OSi(CH$_3$)$_2$H and —OSi(CH$_3$)$_3$. In certain embodiments, n is selected from 1 and 2; and each $R^1$ is independently selected from —CH$_3$ and —OSi(CH$_3$)$_2$H.

In certain embodiments of a hydrosilane-terminated siloxane of Formula (2a), each $R^1$ is the same and in certain embodiments, at least one $R^1$ is different. In certain embodiments, each $R^1$ is selected from methyl, ethyl, n-propyl, iso-propyl, n-butyl, iso-butyl, and tert-butyl. In certain embodiments, each $R^1$ is selected from methyl and ethyl. In certain embodiments, each $R^1$ is methyl.

In certain embodiments of Formula (2a), when $R^1$ is —O—Si$(R^2)_{3-m}$(H)$_m$, m is 0. In certain embodiments of Formula (2a), when $R^1$ is —O—Si$(R^2)_{3-m}$(H)$_m$, m is 1. In certain embodiments of Formula (2a), when $R^1$ is —O—Si$(R^2)_{3-m}$(H)$_m$, m is 2.

In certain embodiments of Formula (2a), each $R^1$ is independently selected from $C_{1-4}$ alkyl, $C_{5-6}$ cycloalkyl, phenyl, and —O—Si$(R^2)_3$, wherein each $R^2$ is independently $C_{1-4}$ alkyl; and n is an integer from 1 to 6.

In certain embodiments, a hydrosilane-terminated siloxane is selected from bis(trimethylsiloxy)-dimethyldisiloxane (bis (1,3,3,3-tetramethyldisiloxanyl)methane) phenyl tris(dimethylsiloxy)silane (3-((dimethylsilyl)methyl)-1,1,1,5,5-petnamethyl-3-phenyltrisiloxane), and tetrakis(dimethylsiloxy) silane.

In certain embodiments, a hydrosilane-terminated siloxane is bis(trimethylsiloxy)-dimethyldisiloxane, (bis(1,3,3,3-tetramethyldisiloxanyl)methane), phenyl tris(dimethylsiloxy) silane, and in certain embodiments, tetrakis(dimethylsiloxy) silane $(Si(-OSi(CH_3)_2H)_4))$.

In certain embodiments of Formula (1), -A'- is derived from bis(trimethylsiloxy)-dimethyldisiloxane and has the structure $-Si(-CH_3)(-OSi(CH_3)_3)-O-Si(-CH_3)(-OSi(CH_3)_3)-$.

In certain embodiments of Formula (1), -A'- is derived from phenyl tris(dimethylsiloxy)silane and has the structure $-Si(-CH_3)_2-O-Si(-phenyl)(-OSi(-H)(-CH_3)_2-O-Si(-CH_3)_2-$.

In certain embodiments, an alkenyl-terminated extended perfluoroether is prepared by reacting an alkenyl-terminated perfluoroether with a hydrosilane-terminated siloxane. In certain embodiments, wherein the alkenyl-terminated perfluoroether is difunctional, the difunctional alkenyl-terminated perfluoroether may be reacted with a difunctional hydrosilane-terminated siloxane in an equivalent ratio of about 2:1 to provide an alkenyl-terminated extended perfluoroether of Formula (1).

Moisture-Curable Compositions

Moisture curing reactions of alkoxysilane-terminated polymers are rapid under ambient conditions and therefore are useful in aerospace sealant applications. Thus, modification of perfluoroethers to provide alkoxysilane-terminated extended and/or unextended perfluoroethers can provide polymers useful in high temperature aerospace sealant applications.

In certain embodiments, a moisture-curable composition comprises an alkoxysilane-terminated extended perfluoroether. In certain embodiments, an alkoxysilane-terminated extended perfluoroether comprises a combination of alkoxysilane-terminated extended perfluoroethers. In certain embodiments, moisture-curable composition comprises one or more unextended alkoxysilane-terminated perfluoroethers and one or more alkoxy-silane-terminated extended perfluoroethers.

In certain embodiments, an alkoxysilane-terminated extended perfluoroether comprises a compound of Formula (3):

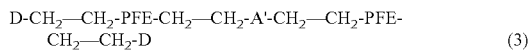

(3)

where each -D is independently $-Si(-R^3)_p(-OR^3)_{3-p}$, where p is independently selected from 0, 1, and 2; and each $R^3$ is independently selected from $C_{1-4}$ alkyl; -A'- comprises structure moiety of Formula (2b):

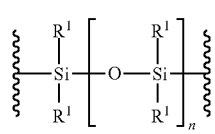

(2b)

where each $R^1$ is independently selected from $C_{1-4}$ alkyl, $C_{5-6}$ cycloalkyl, phenyl, and $-O-Si(R^2)_3$, where each $R^2$ is independently $C_{1-4}$ alkyl; and n is an integer from 1 to 6; and each $-CH_2-CH_2-PFE-CH_2-CH_2-$ is derived from an alkenyl-terminated perfluoroether, $CH_2=CH-PFE-CH=CH_2$, where -PFE- comprises perfluoroether groups.

In certain embodiments of Formula (3), -A'- is derived from a siloxane of Formula (2a). For use in moisture-curable compositions, -A'- does not include hydrosilane groups, e.g., is not hydrosilane-terminated.

In certain embodiments of moisture-curable compositions provided by the present disclosure, an alkoxysilane-terminated extended perfluoroether comprises the reaction products of reactants comprising: (a) an alkenyl-terminated extended perfluoroether; and (b) an alkoxysilane. In certain embodiments, the reactants further comprise a catalyst such as a metal catalyst. Examples of suitable metal catalysts for moisture-curable compositions include zinc, tin, and titanium catalysts such as dibutyltin dioxide, dibutyltin dilaurate, zinc octanoate, and tin octanoate.

In embodiments of the reaction wherein the alkenyl-terminated perfluoroether is difunctional, e.g., two terminal alkenyl groups, the reactants may be combined in a ratio of alkenyl groups to alkoxysilane groups of about 1:1, to provide a product having predominately two terminal alkoxysilane groups such as the alkoxysilane-terminated extended perfluoroether of Formula (3).

In certain embodiments of the reaction, an alkoxysilane comprises a compound of Formula (4):

(4)

where p is selected from 0, 1, and 2; and each $R^3$ is independently selected from $C_{1-4}$ alkyl.

In certain embodiments of a compound of Formula (4), p is 0, p is 1, and in certain embodiments, p is 2. In certain embodiments of a compound of Formula (4), each $R^3$ is the same and in certain at least one $R^3$ is different. In certain embodiments, each $R^3$ is independently selected from methyl, ethyl, n-propyl, isopropyl, n-butyl, iso-butyl, and tert-butyl. In certain embodiments, each $R^3$ is independently selected from methyl and ethyl. In certain embodiments, each $R^3$ is methyl.

In certain embodiments of an alkoxysilane of Formula (4), the alkoxysilane is selected from $H-Si(-OCH_2CH_3)_3$, $H-Si(-OCH_3)_3$, $H-Si(-CH_3)(-OCH_3)_2$, $H-Si(-CH_3)_2(-OCH_3)$, $H-Si(-CH_3)(-OCH_2CH_3)_2$, $H-Si(-CH_3)_2(-OCH_2CH_3)$, $H-Si(-CH_2CH_3)(-OCH_3)$, and $H-Si(-CH_2CH_3)_2(-OCH_3)$.

In certain embodiments of an alkoxysilane of Formula (3), each $-Si(-R^3)_p(-OR^3)_{3-p}$ is selected from $-Si(-OCH_2CH_3)_3$, $-Si(-OCH_3)_3$, $-Si(-CH_3)(-OCH_3)_2$, $-Si(-CH_3)_2(-OCH_3)$, $-Si(-CH_3)(-OCH_2CH_3)_2$, $-Si(-CH_3)_2(-OCH_2CH_3)$, $-Si(-CH_2CH_3)(OCH_3)$, and $-Si(-CH_2CH_3)_2(-OCH_3)$. In certain embodiments, each $-Si(-R^3)_p(-OR^3)_{3-p}$ moiety is $-Si(-OCH_2CH_3)_3$, $-Si(-OCH_3)_3$, and in certain embodiments, $-Si(-CH_3)(-OCH_3)_2$.

In certain embodiments of the reaction, an alkenyl-terminated perfluoroether comprises a single type of alkenyl-terminated perfluoroether, and in certain embodiments, a mixture of different types of alkenyl-terminated perfluoroethers, where the perfluoroethers differ, for example, in molecular weight, perfluoroether backbone, and/or other groups comprising the backbone.

Examples of suitable alkenyl-terminated perfluoroethers for use in the reaction to provide an alkoxysilane-terminated extended perfluoroether include any of those disclosed herein, such as, for example, alkenyl-terminated perfluoroethers of Formula (1)

In addition to an alkoxysilane-terminated extended perfluoroether, moisture-curable compositions provided by the present disclosure may comprise an unextended alkoxysilane-terminated perfluoroether including one or more unextended alkoxysilane-terminated perfluoroethers. An unextended and/or extended alkoxysilane-terminated perfluoroether may comprise a combination of alkoxysilane-terminated perfluoroethers having an average functionality from 2 to 6, such as from 2 to 4, from 2 to 3, and in certain embodiments, from 2 to 2.5.

In certain embodiments, an unextended alkoxysilane-terminated perfluoroether is difunctional, and in certain embodiments comprises an unextended difunctional alkoxysilane-terminated perfluoroether having the structure of Formula (5):

D-CH$_2$—CH$_2$-PFE-CH$_2$—CH$_2$-D  (5)

where each D is independently —Si(—R$^3$)$_p$(—OR$^3$)$_{3-p}$, where each p is independently selected from 0, 1, and 2; and each R$^3$ is independently selected from C$_{1-4}$ alkyl; and —CH$_2$—CH$_2$-PFE-CH$_2$—CH$_2$— is derived from an alkenyl-terminated perfluoroether CH$_2$=CH-FE-CH=CH$_2$, wherein -PFE-comprises polythioether groups.

In certain embodiments, an unextended alkoxysilane-terminated perfluoroether comprises the reaction products of reactants comprising an unextended alkenyl-terminated perfluoroether; and an alkoxysilane.

In certain embodiments of the reaction, an alkenyl-terminated perfluoroether comprises a perfluoroether group selected from —[—CF$_2$—CF$_2$—CF$_2$—O—]$_k$—, —CF$_2$—O—[—CF$_2$—CF$_2$—O—]$_k$—[—CF$_2$—O—]$_k$—CF$_2$—, —[—CF(CF$_3$)—CF$_2$—O—]$_k$—, —[—CF$_2$—CF(CF$_3$)—O—]$_k$—, and a combination of any of the foregoing, and in certain embodiments, each k is 2 to 100.

In certain embodiments of an unextended difunctional alkoxysilane-terminated perfluoroether of Formula (5), each p is 0, each p is 1, and in certain embodiments, each p is 2. In certain embodiments of a compound of Formula (5), each R$^3$ is selected from ethyl and methyl, in certain embodiments, each R$^3$ is ethyl, and in certain embodiments, each R$^3$ is methyl.

In certain embodiments, a moisture-curable composition comprises the reaction products of reactants comprising: (a) an unextended alkenyl-terminated perfluoroether; (b) a hydrosilane-terminated siloxane; and (c) an alkoxysilane.

In certain embodiments of the reaction, the unextended alkenyl-terminated perfluoroether (a) comprises perfluoroether groups selected from —[—CF$_2$—CF$_2$—CF$_2$—O—]$_k$—, —CF$_2$—O—[—CF$_2$—CF$_2$—O—]$_k$—[—CF$_2$—O—]$_k$—CF$_2$—, —[—CF(CF$_3$)—CF$_2$—O—]$_k$—, —[—CF$_2$—CF(CF$_3$)—O—]$_k$—, and a combination of any of the foregoing, wherein each k is independently an integer from 2 to 100.

In certain embodiments of the reaction, the hydrosilane-terminated siloxane (b) comprises a compound of Formula (2a):

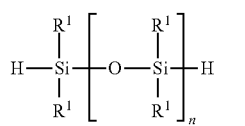

wherein each R$^1$ is independently selected from C$_{1-4}$ alkyl, C$_{5-6}$ cycloalkyl, phenyl, and —O—Si(R$^2$)$_3$, wherein each R$^2$ is independently C$_{1-4}$ alkyl; and n is an integer from 1 to 6.

In certain embodiments, a moisture-curable composition comprises the reaction products of reactants comprising:

a) an alkenyl-terminated perfluoroether comprising a perfluoroether group selected from —[—CF$_2$—CF$_2$—CF$_2$—O—]$_k$—, —CF$_2$—O—[—CF$_2$—CF$_2$—O—]$_k$—[—CF$_2$—O—]$_k$—CF$_2$, —[—CF(CF$_3$)—CF$_2$—O—]$_k$—, —[—CF$_2$—CF(CF$_3$)—O—]$_k$—, and a combination of any of the foregoing, and in certain embodiments, k is 2 to 100;

b) a hydrosilane-terminated siloxane of Formula (2a):

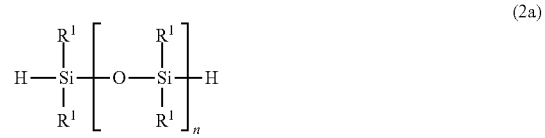

where each R$^1$ is independently selected from C$_{1-4}$ alkyl, C$_{5-6}$ cycloalkyl, phenyl, and —O—Si(R$^2$)$_3$, where each R$^2$ is independently C$_{1-4}$ alkyl; and n is an integer from 1 to 6; and (c) an alkoxysilane of Formula (4):

H—Si(—R$^3$)$_p$(—OR$^3$)$_{3-p}$  (4)

where p is selected from 0, 1, and 2; and each R$^3$ is independently selected from C$_{1-4}$ alkyl.

In certain embodiments, a moisture-curable composition may be prepared by steps comprising: (a) reacting an unextended alkenyl-terminated perfluoroether and a hydrosilane-terminated siloxane to provide a mixture of alkenyl-terminated extended perfluoroethers and unextended alkenyl-terminated perfluoroethers; and (b) reacting the mixture with an alkoxysilane to provide a mixture of alkoxysilane-terminated extended perfluoroethers and unextended alkoxysilane-terminated perfluoroethers.

In certain embodiments, an unextended alkenyl-terminated perfluoroether and a hydrosilane-terminated siloxane are reacted in an equivalent ratio from 8:1 to 2:1; from 6:1 to 2.5:1; from 5:1 to 3:1, and in certain embodiments, 4:1.

In certain embodiments, a moisture-curable composition may be prepared by first reacting a difunctional alkenyl-terminated perfluoroether and a difunctional hydrosilane-terminated siloxane in an equivalent ratio of 4:1 to provide a partially extended perfluoroether meaning that the resulting perfluoroether comprises a mixture of the difunctional alkenyl-terminated perfluoroether and a difunctional alkenyl-terminated extended perfluoroether, such as a mixture of 1:1. In a second step, the mixture of alkenyl-terminated extended and unextended perfluoroethers may be reacted with an alkoxysilane in the presence, for example, of a platinum catalyst, to provide a mixture of alkoxysilane-terminated extended and unextended perfluoroethers. In certain embodiments, an extended alkoxysilane-terminated perfluoroether comprises the reaction products of reactants comprising: (a) an alkenyl-terminated perfluoroether; and (b) a hydrosilane-terminated siloxane.

In certain embodiments of the preceding reaction, the reaction products comprise an alkoxysilane-terminated extended perfluoroether, and in certain embodiments, a mixture of an unextended alkoxysilane-terminated perfluoroether and an alkoxysilane-terminated extended perfluoroether.

For moisture-curable compositions it is desirable that the alkenyl-terminated extended perfluoroether not contain any or substantially any reactive hydrosilane groups. This may be accomplished by reacting appropriate equivalent ratios of alkenyl and hydrosilane groups.

In certain embodiments of moisture-curable compositions, a hydrosilane-terminated siloxane has the structure of Formula (2a):

where each R$^1$ is independently selected from C$_{1-4}$ alkyl, C$_{5-6}$ cycloalkyl, phenyl, and —O—Si(R$^2$)$_3$, where each R$^2$ is independently C$_{1-4}$ alkyl; and n is an integer from 1 to 6.

In certain embodiments of Formula (2a), n is 1, n is 2, n is 3, n is 4, n is 5, and in certain embodiments, n is 6.

In certain embodiments of Formula (2a), each $R^1$ is independently selected from methyl, ethyl, phenyl, and —Si($R^2$)$_3$. In certain embodiments, each $R^1$ is independently selected from methyl, ethyl, and phenyl. In certain embodiments, each $R^1$ is independently selected from methyl and phenyl. In certain embodiments, each $R^1$ is independently selected from methyl, phenyl, and —Si($R^2$)$_3$. In certain embodiments, each $R^1$ is independently selected from methyl, ethyl, n-propyl, isopropyl, n-butyl, isobutyl, and tert-butyl. In certain embodiments, each $R^1$ is methyl.

In certain embodiments of —Si($R^2$)$_3$, each $R^2$ is independently selected from methyl, ethyl, n-propyl, isopropyl, n-butyl, isobutyl, and tert-butyl. In certain embodiments, each $R^2$ is independently selected from methyl and ethyl, in certain embodiments, each $R^2$ is ethyl, and in certain embodiments, each $R^2$ is methyl.

In certain embodiments, a partially extended perfluoroether may be prepared, where partial extension refers to a reaction product of an alkenyl-terminated perfluoroether with a hydrosilane-terminated siloxane such that the product comprises a combination of extended perfluoroethers and non-extended perfluoroethers. For example, the reaction of a difunctional alkenyl-terminated perfluoroether with a difunctional hydrosilane-terminated siloxane in an equivalent ration of 2:<1, such as 2:0.8, 2:0.6, 2:0.5, 2:0.4 or 2:0.2, provides predominately a mixture of extended and unextended alkenyl-terminated perfluoroethers.

An alkenyl-terminated perfluoroether may then be capped or terminated with an alkoxysilane such as —O—Si(—O$R^2$)$_3$, including, for example, trimethoxysilane, or triethoxysilane to provide an alkoxysilane-terminated perfluoroether, which, in certain embodiments, may be a combination of alkoxysilane-terminated extended perfluoroethers and unextended alkoxysilane-terminated perfluoroethers.

In certain embodiments, an alkoxysilane-terminated perfluoroether comprises a perfluoroether of Formula (3), a perfluoroether of Formula (5), and in certain embodiments, a mixture of an alkoxysilane-terminated extended perfluoroether of Formula (3) and an unextended alkoxysilane-terminated perfluoroether of Formula (5).

Uncured compositions comprising a combination of alkoxysilane-terminated extended perfluoroethers and unextended alkoxysilane-terminated perfluoroethers, e.g., partially extended alkoxy-terminated perfluoroethers, may be viscous pastes at room temperature and, when moisture-cured, exhibit high thermal resistance and other properties useful in aerospace sealant applications.

Addition-Curable Compositions

In certain embodiments of the present disclosure, addition-curable compositions are provided. Addition-curable compositions provided by the present disclosure may be cured by the reaction of perfluoroethers having terminal alkenyl groups, —CH=CH$_2$ (alkenyl-terminated perfluoroethers), with perfluoroethers having terminal hydrosilane groups, —Si(R)$_2$H (hydrosilane-terminated perfluoroethers), in the presence of a metal catalyst.

In general, addition-curable compositions comprise an alkenyl-terminated perfluoroether or mixture of alkenyl-terminated perfluoroethers, and a hydrosilane-terminated perfluoroether or a mixture of hydrosilane-terminated perfluoroethers. An alkenyl-terminated perfluoroether may comprise any of those disclosed herein. A hydrosilane-terminated perfluoroether may be similar to the alkoxysilane-terminated perfluoroethers disclosed herein, except that the perfluoroether is terminated with one or more hydrosilane groups.

In certain embodiments of addition-curable compositions, an alkenyl-terminated perfluoroether may be extended and/or unextended, and a hydrosilane-terminated perfluoroether may be extended and/or unextended.

In certain embodiments, an addition-curable composition comprises one or more unextended alkenyl-terminated perfluoroethers and a combination of extended and unextended hydrosilane-terminated perfluoroethers having an average functionality from 2 to 6, from 3 to 6, from 4 to 6, from 3 to 5, and in certain embodiments, from 4 to 5.

In certain embodiments of an addition-curable composition, the equivalent ratio of terminal alkenyl groups to terminal hydrosilane groups from 0.5:1 to 1.5:1, from 0.75:1 to 1.25:1, from 0.8:1 to 1.2:1, from 0.9:1 to 1.1:1, from 0.95:1 to 1.05:1, and in certain embodiments, is 1:1.

In certain embodiments, addition-curable compositions comprise (a) an alkenyl-terminated perfluoroether, and (b) a hydrosilane-terminated extended perfluoroether.

In certain embodiments, an alkenyl-terminated perfluoroether comprises a single type of alkenyl-terminated perfluoroether or a combination of alkenyl-terminated perfluoroethers. An alkenyl-terminated perfluoroether may comprise any of the unextended alkenyl-terminated perfluoroethers disclosed herein, such as for example, an unextended alkenyl-terminated perfluoroether of the formula CH$_2$=CH-PFE-CH=CH$_2$, or combinations thereof. In certain embodiments, an alkenyl-terminated perfluoroether may be a difunctional unextended alkenyl-terminated perfluoroether. In certain embodiments, an alkenyl-terminated perfluoroether comprises an alkenyl-terminated extended perfluoroether or combination of alkenyl-terminated extended perfluoroethers including any of those disclosed herein such as, for example, an alkenyl-terminated extended perfluoroether of Formula (1). In certain embodiments, an alkenyl-terminated perfluoroether may be a difunctional alkenyl-terminated extended perfluoroether. In certain embodiments, an alkenyl-terminated perfluoroether comprises a combination of unextended alkenyl-terminated perfluoroethers and alkenyl-terminated extended perfluoroethers. In certain embodiments, an alkenyl-terminated perfluoroether comprises a combination of unextended difunctional alkenyl-terminated perfluoroethers and difunctional alkenyl-terminated extended perfluoroethers.

Hydrosilane-terminated perfluoroethers useful in addition-curable compositions include difunctional hydrosilane-terminated perfluoroethers, hydrosilane-terminated perfluoroethers having a functionality greater than 2, and combinations thereof. Hydrosilane-terminated perfluoroethers may be unextended hydrosilane-terminated perfluoroethers, hydrosilane-terminated extended perfluoroethers, or combinations thereof.

In certain embodiments, an addition-curable composition comprises a hydrosilane-terminated perfluoroether having the structure of Formula (8):

$$A\text{-}CH_2\text{---}CH_2\text{-PFE-}CH_2\text{---}CH_2\text{-}A \qquad (8)$$

where each A- is independently selected from a moiety of Formula (2c) and Formula (10b):

(2c)

-continued

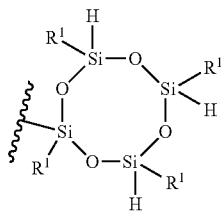
(10b)

where each $R^1$ is independently selected from $C_{1-4}$ alkyl, $C_{5-6}$ cycloalkyl, phenyl, and $-O-Si(R^2)_{3-m}(H)_m$, where each $R^2$ is independently $C_{1-4}$ alkyl, m is selected from 0, 1, and 2; n is an integer from 1 to 6; and $-CH_2-CH_2$-PFE-$CH_2-CH_2-$ is derived from a dialkenyl-terminated perfluoroether of the formula $CH_2=CH$-PFE-$CH=CH_2$ where -PFE- comprises perfluoroether groups.

In certain embodiments, an addition-curable composition comprises a hydrosilane-terminated extended perfluoroether having the structure of Formula (9);

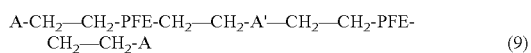

where each A- is independently a group of Formula (2c):

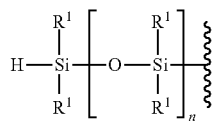
(2c)

where each $R^1$ is independently selected from $C_{1-4}$ alkyl, $C_{5-6}$ cycloalkyl, phenyl, and $-O-Si(R^2)_{3-m}(H)_m$, where each $R^2$ is independently $C_{1-4}$ alkyl; and m is selected from 0, 1, and 2; n is an integer from 1 to 6; and -A'- is a group of Formula (2c):

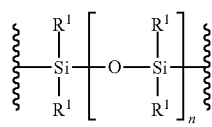
(2b)

where each $R^1$ is independently selected from $C_{1-4}$ alkyl, $C_{5-6}$ cycloalkyl, phenyl, and $-O-Si(R^2)_{3-m}(H)_m$, where each $R^2$ is independently $C_{1-4}$ alkyl; and m is selected from 0, 1, and 2; and n is an integer from 1 to 6; and $-CH_2-CH_2-$PFE-$CH_2-CH_2-$ is derived from a dialkenyl-terminated perfluoroether $CH_2=CH$-PFE-$CH=CH_2$ wherein -PFE- comprises perfluoroether groups.

In perfluoroethers of Formula (8) and Formula (9), the moiety $-CH_2-CH_2$-PFE-$CH_2-CH_2-$ may be derived from a difunctional alkenyl-terminated perfluoroether having the structure $CH_2=CH$-PFE-$CH=CH_2$; and each -A and -A'- are derived from a hydrosilane-terminated siloxane.

In certain embodiments of Formula (8) and Formula (9), -PFE- comprises perfluoroether groups selected from $-[-CF_2-CF_2-CF_2-O-]_k-$, $-CF_2-O-[-CF_2-CF_2-O-]-[-CF_2-O-]_k-CF_2-$, $-[-CF(CF_3)-CF_2-O-]_k-$, $-[-CF_2-CF(CF_3)-O-]_k-$, and a combination of any of the foregoing, wherein each k is independently an integer from 2 to 100.

Hydrosilane-terminated perfluoroethers provided by the present disclosure may be prepared by reacting an alkenyl-terminated perfluoroether, such as a difunctional alkenyl-terminated perfluoroether, with a hydrosilane-terminated siloxane. The alkenyl-terminated perfluoroether and the hydrosilane-terminated siloxane may be any of those disclosed herein. In certain embodiments, the alkenyl-terminated perfluoroether has the structure $CH_2=CH$-PFE-$CH=CH_2$ and the hydrosilane-terminated siloxane has the structure of Formula (2a).

In certain embodiments, an addition-curable composition comprises a combination of hydrosilane-terminated perfluoroethers of Formula (8) and Formula (9). In certain embodiments, an addition-curable composition comprises a combination of alkenyl-terminated extended perfluoroethers of Formula (1) and in certain embodiments, of the formula $CH_2=CH$-PFE-$CH=CH_2$.

In certain embodiments, when used as a terminal group, and not as an extending group, a hydrosilane-terminated siloxane may be selected from bis(trimethylsiloxy)-dimethyldisiloxane, phenyl tris(dimethylsiloxy)silane, teteramethylcyclotetrasiloxane (bis(trimethylsiloxy)-dimethylsiloxane (1,1,1,3,5,7,7,7-octamethyltetrasiloxane, TMCTS), and tetrakis(dimethylsiloxy)silane (Si—(OSiMe$_2$H)$_4$).

In certain embodiments of Formula (8) and Formula (9), each -A is derived from bis(trimethylsiloxy)-dimethylsiloxane (1,1,1,3,5,7,7,7-octamethyltetrasiloxane), and each -A has the structure:

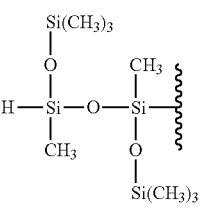

and the corresponding compound of Formula (8) and/or Formula (9) is a hydrosilane-terminated perfluoroether having at least two reactive hydrosilane functionalities. Depending on whether the siloxane used as an extending group includes hydrosilane groups, the corresponding compound of Formula (8) and/or Formula (9) may have more than two reactive hydrosilane functionalities.

In certain embodiments of compounds of Formula (8) and Formula (9), each -A is derived from phenyl tris(dimethylsiloxy)silane (3-((dimethylsilyl)oxy)-1,2,5,5-tetramethyl-3-phenyltrisiloxane), and each -A has the structure:

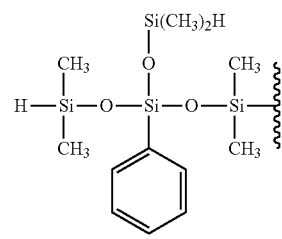

and the corresponding compound of Formula (8) and/or Formula (9) is a hydrosilane-terminated perfluoroether having at least four reactive hydrosilane functionalities. Depending on whether the siloxane used as an extending group includes hydrosilane groups, the corresponding compound of Formula (8) and/or Formula (9) may have more than four reactive hydrosilane functionalities.

In certain embodiments, each -A is derived from is derived from tetramethylcyclotetrasiloxane(2,4,6,8-tetramethyl-1,3,5,7,2,4,6,8-tetraoxatetrasilocane) (TMCTS), and each -A has the structure:

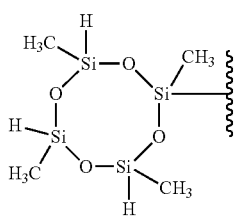 [SMILES: *[Si]1(C)O[SiH](C)O[SiH](C)O[SiH](C)O1]

and the corresponding compound of Formula (8) and/or Formula (9) is a hydrosilane-terminated perfluoroether having at least six reactive hydrosilane functionalities. Depending on whether the siloxane used as an extending group includes hydrosilane groups, the corresponding compound of Formula (8) and/or Formula (9) may have more than six reactive hydrosilane functionalities.

In certain embodiments, -A is derived from tetrakis(dimethylsiloxy)silane, and each -A has the structure:

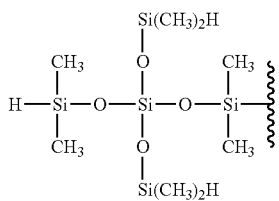

and the corresponding compound of Formula (8) and/or Formula (9) is a hydrosilane-terminated perfluoroether having at least six reactive hydrosilane functionalities. Depending on whether the siloxane used as an extending group includes hydrosilane groups, the corresponding compound of Formula (8) and/or Formula (9) may have more than six reactive hydrosilane functionalities. In certain embodiments of Formula (8) and Formula (9), each A- is $Si(CH_3)_2H-O-Si(-O-Si(CH_3)_2H)_2-O-Si(CH_3)_2-$.

As indicated, polyfunctional hydrosilane-terminated perfluoroethers may also be prepared by extension using a hydrosilane-terminated siloxane as an extender followed by capping with a hydrosilane-terminated siloxane. This may be accomplished in a two-step process comprising extension followed by capping or termination, or in a single reaction step. Such reactions can produce hydrosilane-terminated perfluoroethers having various hydrosilane functionalities, with the predominant or average functionality determined by the equivalent ratio of the reactants.

For example, as shown in Scheme 1, a difunctional hydrosilane-terminated perfluoroether may be prepared by reacting a difunctional alkenyl-terminated perfluoroether and bis(trimethylsiloxy)-dimethylsiloxane in the presence of a catalyst, such as a platinum catalyst, to provide an unextended difunctional hydrosilane-terminated perfluoroether.

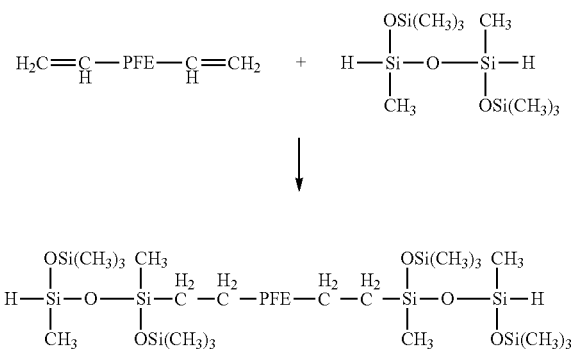

As shown in Scheme 2, a tetrafunctional hydrosilane-terminated perfluoroether may be prepared by reacting a difunctional alkenyl-terminated perfluoroether and phenyl tris(dimethylsiloxy)silane in the presence of a catalyst, such as a platinum catalyst, to provide an unextended tetrafunctional hydrosilane-terminated perfluoroether.

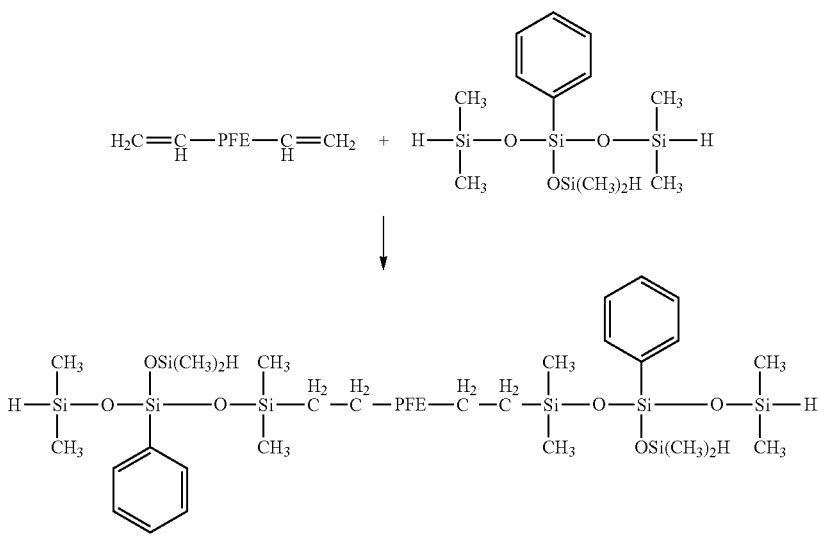

As shown in Scheme 3, a pentafunctional hydrosilane-terminated perfluoroether may be prepared by reacting a difunctional alkenyl-terminated perfluoroether and phenyl tris(dimethylsiloxy)silane in the presence of a catalyst such as a platinum catalyst, to provide a pentafunctional hydrosilane-terminated extended perfluoroether in which the extending group has a single hydrosilane group, and phenyl tris(dimethylsiloxy)silane terminal groups.

of Formula (9), and a pentafunctional hydrosilane-terminated perfluoroether of Formula (9), in an equivalent ratio of 1:0.5: 0.5, respectively.

As another example, a sealant provided by the present disclosure may comprise a difunctional alkenyl-terminated

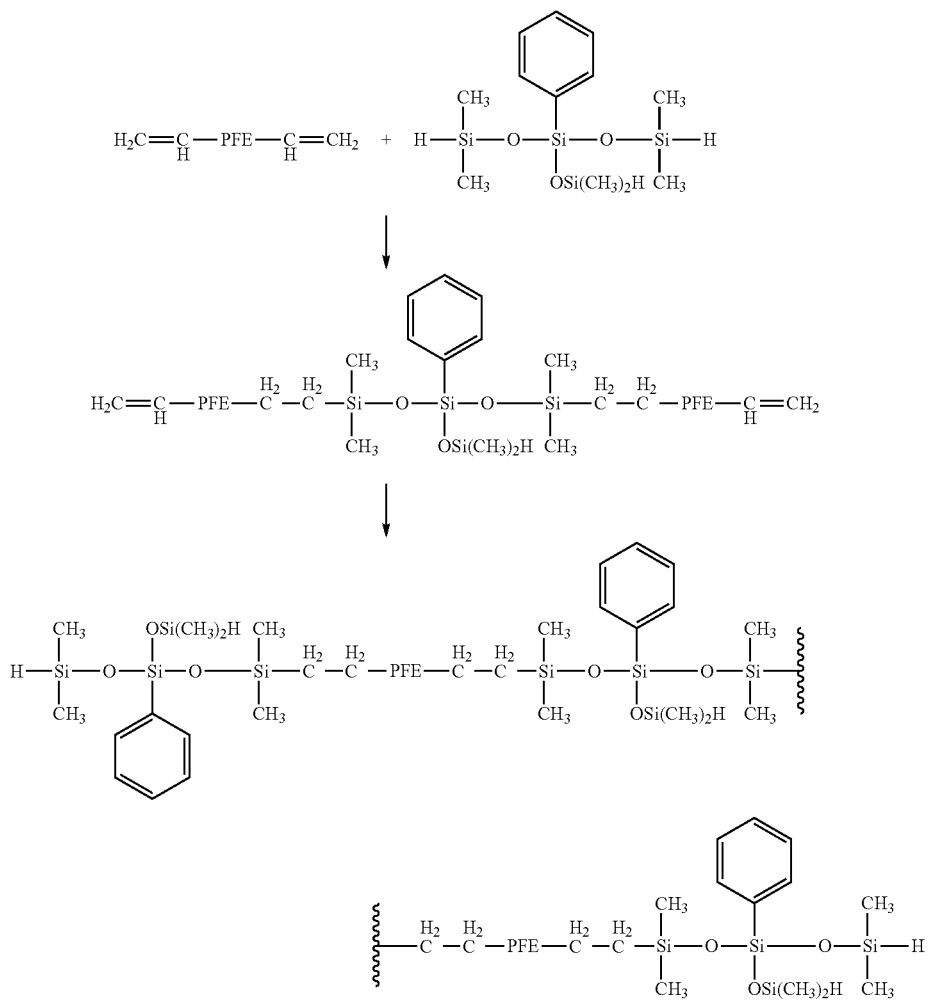

Scheme 3

In certain embodiments, the alkenyl-terminated perfluoroether is a difunctional alkenyl-terminated perfluoroether, which may be unextended, extended, or a combination thereof.

In certain embodiments, an extended and/or unextended hydrosilane-terminated perfluoroether comprises two hydrosilane functionalities, in certain embodiments, three hydrosilane functionalities, four hydrosilane functionalities, five hydrosilane functionalities, six hydrosilane functionalities, and in certain embodiments, more than six hydrosilane functionalities. An addition-curable composition provided by the present disclosure may comprise a combination of extended and/or unextended hydrosilane-terminated perfluoroethers having two hydrosilane terminal groups, three, four, five, six, more than six hydrosilane terminal groups, or a combination of any of the foregoing.

For example, a sealant provided by the present disclosure may comprise a difunctional alkenyl-terminated perfluoroether, a tetrafunctional hydrosilane-terminated perfluoroether perfluoroether, a difunctional hydrosilane-terminated perfluoroether, a tetrafunctional hydrosilane-terminated perfluoroether of Formula (9), and a hexafunctional hydrosilane-terminated perfluoroether of Formula (9), in an equivalent ratio of 1:0.15:0.7:0.15, respectively.

Suitable catalysts for use in the reaction of an alkenyl-terminated perfluoroether with an hydrosilane-terminated siloxane include Speier's catalyst (hexachloroplatinic acid $H_2PtCl_6$) and Karstedt catalyst (a complex of platinum with divinyltetramethyldisiloxane).

Sealants

Alkoxysilane-terminated perfluoroethers provided by the present disclosure are useful in moisture-curable compositions, such as coatings and sealant compositions, including those that may be employed as aerospace sealants and as linings for fuel tanks. As a result, certain embodiments provided by the present disclosure are directed to compositions, such as one-part compositions, that include an alkoxysilane-terminated perfluoroether and a curing agent. In these one-part compositions, an alkoxysilane-terminated perfluoroether and curing agent, optionally in combination with other composition components, are combined and packaged in a single, moisture-sealed, such as vacuum-sealed or sealed with an inert gas, container to substantially prevent curing prior to use. The compositions are stable at ambient temperatures under conditions substantially free of moisture. Free of moisture and substantially free of moisture means that, although a composition may contain some moisture, the amount of moisture is not sufficient to substantially effect curing of the composition. When a composition is exposed to sufficient moisture, curing of the composition is promoted to form a sealant useful in many applications, including, for example, aerospace and similar applications.

Addition-curable compositions comprising hydrosilane-terminated perfluoroethers provided by the present disclosure are typically two-part systems. In certain embodiments, such compositions, including sealants, may be provided as multi-part compositions, such as two-part compositions, wherein one part comprises one or more hydrosilane-terminated perfluoroethers provided by the present disclosure and a second part comprises one or more alkenyl-terminated perfluoroethers provided by the present disclosure. Additives and/or other materials may be added to either part as desired or as necessary. The two parts may be combined and mixed prior to use. In certain embodiments, the pot life of the mixed composition is at least 30 minutes, at least 1 hour, at least 2 hours, and in certain embodiments, more than 2 hours, where pot life refers to the period of time the mixed composition remains suitable for application as a sealant after mixing. A hydrosilylation catalyst, such as a platinum catalyst, may be included in either part, or may be included in a third part and combined prior to application.

In certain embodiments, alkoxysilane-terminated perfluoroethers and hydrosilane-terminated perfluoroethers provided by the present disclosure may be present in a composition in an amount from 30 wt % to 90 wt %, such as from 40 wt % to 80 wt %, or, in certain embodiments, from 45 wt % to 75 wt %, where wt % is based on the total weight of all non-volatile components of the composition.

In certain embodiments, compositions may comprise one or more adhesion promoters. An adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy-, mercapto-, or amino-terminated silanes, such as Silquest® A-187 and Silquest® A-1100. Other useful adhesion promoters are known in the art. Compositions may comprise a sulfur-containing adhesion promoter as disclosed in U.S. application Ser. No. 13/529,183 filed on Jun. 21, 2012.

Compositions provided by the present disclosure may comprise one or more different types of filler. Suitable fillers include those commonly known in the art, including inorganic fillers, such as carbon black and calcium carbonate ($CaCO_3$), silica, metal oxide, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, pigments, plasticizers, surfactants, thixotropic agents, accelerators such as amines, including 1,4-diazabicyclo[2.2.2]octane, fire retardants, adhesion promoters, solvents, masking agents, or a combination of any of the foregoing. In certain embodiments of compositions provided by the present disclosure, a basic oxide is present in an amount of 0.1 wt % to 10 wt %, such as 1 wt % to 10 wt %, or, in certain embodiments, 5 wt % to 10 wt %, based on the total weight of the composition. As can be appreciated, fillers and additives employed in a composition may be selected so as to be compatible with each other as well as the polymeric component, curing agent, and or catalyst.

In certain embodiments, compositions provided by the present disclosure comprise a basic oxide. Basic oxides may be particularly useful in moisture-curable compositions where they may act as dehydrating agents, thereby preventing premature cure of the composition, but when cure is desired, the base that is generated acts as a curing catalyst. As a result, it is possible to use less cure accelerator, such as an amine, in moisture-curable compositions e, which may further extend the shelf-life of the compositions. Examples of basic oxides suitable for use in compositions provided by the present disclosure include calcium oxide, magnesium oxide, barium oxide, or a combination of any of the foregoing. In certain embodiments of compositions provided by the present disclosure, a basic oxide is present in an amount of 0.1 wt % to 10 wt %, such as 1 wt % to 10 wt %, or, in certain embodiments, 5 wt % to 10 wt %, based on the total weight of the composition.

In certain embodiments, moisture-curable compositions include a tin catalyst. Examples of suitable tin catalysts include organo tin compounds such as aliphatic titiantes including dibutyltin oxide, dibutyltin bis(acetylacetonate), dibutyltin dilaurate, dibutyltin diacetate, tetrabutyl titanate, and tetraethyltitanate.

In certain embodiments, addition-curable compositions provided by the present disclosure comprise a platinum catalyst. Examples of suitable platinum catalysts include Speier's catalyst and Karstedt catalyst.

In certain embodiments, compositions provided by the present disclosure comprise electrically conductive filler. Electrical conductivity and EMI/RFI shielding effectiveness can be imparted to a composition by incorporating conductive materials. Conductive elements can include, for example, metal or metal-plated particles, fabrics, meshes, fibers, and combinations of any of the foregoing. The metal may be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. In certain embodiments, a composition comprises at least about 20 wt % and in certain embodiments, at least about 30 wt % of an electrically conductive filler.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of an electrically conductive filler used in a composition provided by the present disclosure may be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain compositions provided by the disclosure, a base composition can comprise Ni-coated graphite as a particle, powder or flake. In certain embodiments, the amount of Ni-coated graphite in a base composition can range from 40 wt % to 80 wt %, and in certain embodiments can range from 50 wt % to 70 wt %, based on the total weight of the base composition. In certain embodiments, electrically conductive filler can comprise nickel fiber. Nickel fiber can have a diameter ranging from 10 µm to 50 µm and have a length ranging from 250 µm to 750 µm. A base composition can comprise, for example, an amount of nickel fiber ranging from 2 wt % to 10 wt %, and in certain embodiments, from 4 wt % to 8 wt %, based on the total weight of the base composition.

Carbon fibers, particularly graphitized carbon fibers, may also be used to impart electrical conductivity to a composition provided by the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 micron to tens of nanometers can be used as electrically conductive fillers.

The average particle size of electrically conductive filler may be within a range useful for imparting electrical conductivity to a composition. For example, in certain embodiments, the particle size of the one or more fillers can range from 0.25 µm to 250 µm, in certain embodiments can range from 0.25 µm to 75 µm, and in certain embodiments can range from 0.25 µm to 60 µm.

In certain embodiments, electrically conductive polymers may be used to impart or modify the electrical conductivity of a composition provided by the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene) vinylene, and polyacetylene. Compositions provided by the present disclosure can comprise more than one electrically conductive filler, and the more than one electrically conductive filler can be of the same or different materials and/or shapes. For example, a sealant composition may comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω/cm², and in certain embodiments, a sheet resistance of less than 0.15 Ω/cm². The amount and type of filler can also be selected to provide effective EMI/RFI shielding over a frequency range of from 1 MHz to 18 GHz for an aperture sealed using a sealant composition provided by the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, a corrosion inhibitor can comprise less than 10% by weight of the total weight of the electrically conductive composition. In certain embodiments, a corrosion inhibitor can comprise an amount ranging from 2% by weight to 8% by weight of the total weight of the electrically conductive composition. Corrosion between dissimilar metal surfaces may also be minimized or prevented by the selection of the type, amount, and properties of the conductive fillers comprising the composition.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those skilled in the art.

Compositions provided by the present disclosure may be applied directly onto the surface of a substrate or over an underlayer or a coating by any suitable coating process known to those skilled in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and a humidity from 0% RH to 100% RH (or in the case of a moisture-curable composition, at a humidity greater than 0% RH). In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles including aircraft and aerospace vehicles.

In certain embodiments, for storage and transportation, the composition components, including an alkoxysilane-terminated perfluoroether and curing agent, are combined in a container and sealed from moisture. While sealed from moisture in the container, the moisture-curable composition is stable and remains substantially uncured for an extended time period.

For addition-curable compositions, the two-parts may be mixed prior to use and applied to the substrate as long as the mixed components remain workable. Addition curable compositions include a hydrosilylation catalyst such as a platinum catalyst in the olefin-containing part, the silyl-containing part, or may be included in a third part and combined with the first and second parts prior to application.

When exposed to the moisture in air, the components of moisture-curable compositions provided by the present disclosure react to provide cured compositions, including sealant compositions.

In certain embodiments, a composition provided by the present disclosure achieves a tack-free cure in less than about 2 hours, less than about 4 hours, less than about 7 hours, and in certain embodiments, less than about 10 hours at a temperature of less than about 200° F.

Cured compositions such as cured sealants exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that when cured, curable compositions of the present disclosure used in aviation and aircraft applications exhibit a percent volume swell not greater than 25% following immersion for one week at 60° C. (140° F.) and ambient pressure in Jet Reference Fuel Type I (JRF Type I). Other properties, ranges, and/or thresholds may be appropriate for other sealant applications.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi and in some cases at least 400 psi when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

Apertures, including apertures of aerospace vehicles, sealed with compositions provided by the present disclosure are also disclosed.

In certain embodiments, an electrically conductive sealant composition provided by the present disclosure exhibits the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

In certain embodiments, a cured sealant comprising an addition-curable composition provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF Type I, a hardness of 36, a tensile strength of 312 psi, and an elongation of 247%.

EXAMPLES

Embodiments provided by the present disclosure are further illustrated by reference to the following examples, which describe the synthesis, properties, and uses of certain perfluoroethers and compositions comprising such perfluoroethers. It will be apparent to those skilled in the art that many modifications, both to materials, and methods, may be practiced without departing from the scope of the disclosure.

Example 1

Diallyl Ether of Fluorolink®-D

Perfluoroether diol Fluorolink®-D (Solvay) was extracted five times with an equal weight of isopropanol. Removal of solvents from the polymeric portion provided diol fractions of higher molecular weight. Allylation of the diol was accomplished by following a modified version of the procedure for allylation of phenol described by Wu et al., *Ind. Eng. Chem. Res.*, 1995, 34 (5), 1536-1538. The diallyl ether was estimated to have a molecular weight from about 3,500 to about 4,200, based on multiple lots.

Example 2

Synthesis of Olefin Intermediate

The diallyl ether of Example 1 (150 g, 0.0357 moles) was charged into a 250-mL, 3-necked, round-bottomed flask. The flask was equipped with a stirrer, a temperature probe, and a gas-adapter. The polymer was evacuated at 66° C./7-8 mmHg for 1 hr and cooled to room temperature. The vacuum was released under nitrogen, a solution of platinum catalyst (0.1 g, PC075, United Chemical Technologies) in $\alpha,\alpha,\alpha$-trifluorotoluene (0.5 mL) was added, and the contents were stirred at room temperature for 1 hr. 1,3-Bis(trimethylsiloxy)-1,3-dimethyldisiloxane (5.727 g, 0.0202 mole, Gelest) was added along with 0.5 mL of $\alpha,\alpha,\alpha$-trifluorotoluene and the reaction mixture was stirred at room temperature for 9.5 hr. The viscosity of the reaction mixture was 1.84 poise. Another portion (0.2 g) of 1,3-bis(trimethylsiloxy)-1,3-dimethyldisiloxane (total amount: 1.927 g, 0.0209 mole) was added along with 0.5 mL of α,α,α-trifluorotoluene and the reaction mixture was heated at 38-39° C. for 3 hr. The viscosity increased slightly to 1.94 poise. Phenyl tris(dimethylsiloxy)silane (1.571 g, 0.0048 mole, Gelest) was introduced along with 0.5 mL of α,α,α-trifluorotoluene. The reaction mixture was heated at 38-39° C. for 13.5 hr and evacuated (vacuum: 7-8 mmHg) for 1 hr to provide an olefin intermediate having a viscosity of 7.32 poise, a theoretical olefin equivalent of 9438, and a theoretical functionality of about 2.8.

Example 3

Synthesis of Moisture-Curable Polymer I

A freshly prepared sample of the olefin intermediate of Example 2 (40 g; 0.0015 mole) was charged into a 100-mL, 3-necked, round-bottomed flask. The flask was equipped with a stirrer, a temperature probe, and a gas-adapter. The freshly prepared sample of olefin intermediate contained a platinum catalyst and no additional catalyst was added during the hydrosilylation reaction. While stirring, methyldimethoxysilane (1.4 g; 0.0132 mole) was added and the mixture was stirred for another hour. The reaction mixture was heated at 74° C. for 5 hr and cooled to room temperature. Another portion (0.4 g, 0.0038 mole) of methyldimethoxysilane was added and heating was continued at 74° C. for 8 hr. The reaction mixture was then cooled to 60° C. and evacuated (vacuum: 7-8 mmHg) for 1 hr to provide a moisture-curable polymer I having a viscosity of 20.6 poise.

Example 4

Synthesis of Tetrafunctional Polymeric Silane

The diallyl ether of Example 1 (20 g, 0.0055 moles) was charged into a 100-mL, 3-necked, round-bottomed flask. The flask was equipped with a stirrer, a temperature probe, and a gas-adapter. The flask was flushed with dry nitrogen. A solution of platinum catalyst (PC075) (0.015 g) in α,α,α-trifluorotoluene (1 mL) was added and the contents were stirred at room temperature for 45 min. Phenyl tris(dimethylsiloxy) silane (4 g, 0.0121 mole) was introduced and the mixture was stirred for 10 hr. Another portion of the platinum catalyst PC075 (0.15 g dissolved in 1 mL of α,α,α-trifluorotoluene) was added and stirred at room temperature for 8 hr. The reaction mixture was washed with two, 20 mL portions of toluene to remove the catalyst and unconsumed silane. Removal of residual solvents under vacuum (1 hr at room temperature/7-8 mmHg) provided a clear polymer having a viscosity of 4.43 poise.

Example 5

Synthesis of Olefin for Addition Curing

The diallyl ether of Example 1 (80 g, 0.0219 moles) was charged into a 100-mL, 3-necked, round-bottomed flask. The flask was equipped with a stirrer, a temperature probe, and a gas-adapter. The flask was flushed with dry nitrogen. A solution of platinum catalyst (PC075) (0.015 g) in α,α,α-trifluorotoluene (1 mL) was added and the contents were stirred at room temperature for 1 hr. 1,3-Bis(trimethylsiloxy)-1,3-dimethyldisiloxane (3.515 g, 0.124 mole) was added along with 1 mL of α,α,α-trifluorotoluene. The reaction mixture was stirred at room temperature for 1.5 hr and at 43-48° C. for 5 hr. At this stage, the viscosity of the reaction mixture was 2.44 poise. Phenyl tris(dimethylsiloxy)silane (0.964 g, 0.0029 mole) was introduced with 0.5 mL of α,α,α-trifluorotoluene and the mixture stirred at room temperature for 1 hr and then at 47-48° C. for 7 hr. Removal of the solvents under vacuum (1 hr at room temperature/7-8 mmHg) provided a liquid polymer having a viscosity of 19 poise and a theoretical functionality of 2.8.

Example 6

Tin Catalyst for Moisture-Cured Sealant

A mixture of dibutyltin dioxide (34.72 g), wetting and dispersing additive Dysperbyk® 110 (16.67 g) and 1-butanol (6.94 g) was milled using a high speed mixing blade until a suitable dispersion formed. Perfluoropolyether oil, Demnum™ S-200 (27.78 g, Daikin Industries), and distilled water (13.89 g) were added in sequence and each addition was followed by further milling.

Example 7

Moisture-Cured Sealant I

A polymer mix was prepared by mixing the moisture-curable polymer I of Example 3 (37.1 g) with Demnum™ S-200 (3.71 g). Separately, a filler mix was prepared by pulverizing a mixture of calcium carbonate (7.42 g), red iron oxide (1.484 g), zinc oxide (1.484 g), and triphenylimidazole (heat stabilizer, 0.371 g), followed by mixing with carbon black (6.678 g). A base was prepared by bench-milling the polymer mix with small portions of the filler mix. Base was then bench-milled with the catalyst (0.6 g) of Example 6 and a flow-out was made. The flow-out was cured at room temperature for 3 days and then at 140° F. for 4 days. The properties of the cured composition were as follows: hardness: 25 (Shore A); elongation (325%); and tensile strength: 200 psi. A small piece of the cured specimen was maintained at 177° C. for a qualitative estimate of the thermal properties. The specimen lost 7% of its original weight after 3,652 hr.

Example 8

Moisture-Curable Polymer II

The diallyl ether of Example 1 (40 g, 0.0095 mole) was charged into a 100-mL, 3-necked, round-bottomed flask. The flask was equipped with a stirrer, a temperature probe, and a gas-adapter. The flask was flushed with nitrogen. While stirring, a solution of platinum catalyst (0.04 g, PC075) in α,α,α-trifluorotoluene (0.5 mL) was added and the contents were stirred at room temperature for 1 hr. 1,3-Bis(trimethylsiloxy)-1,3-dimethyldisiloxane (1.553 g, 0.0055 mole, Gelest) was added along with 0.5 mL of α,α,α-trifluorotoluene. The reaction mixture was stirred at room temperature for 1 hr and then at 49-50° C. for 2.5 hr. Phenyl tris(dimethylsiloxy)silane (0.426 g, 0.0013 mole) was introduced with 1 mL of α,α,α-trifluorotoluene and the reaction mixture was heated to 49-50° C. for 7 hr. Evacuation of the reaction mixture (room temperature to 50° C./40 min, vacuum: 7-8 mmHg) provided an olefin intermediate. Methyldimethoxysilane (1.5 g; 0.0132 mole) was added along with 1 mL of α,α,α-trifluorotoluene at 50° C. Heating was continued at 50° C. for 4 hr and then at 79° C. for 2.5 hr. Evacuation of the reaction mixture provided moisture-curable polymer II.

Example 9

Moisture-Cured Sealant II

Moisture-curable polymer II of Example 8 (38 g) was bench-milled with triphenylimidazole (heat stabilizer, 0.38 g)

and calcium carbonate (7.6 g). Carbon black (6.84 g), red iron oxide (1.52 g), zinc oxide (1.52 g) and Demnum™ S-200 (3.8 g) were added in sequence and each addition was followed by bench-milling. The tin catalyst (0.6 g) of Example 6 was then bench-milled with the mixture and a flow-out was made. The flow-out was cured in an atmosphere of high humidity/room temperature for 4 days. The properties of the cured composition are as follows: hardness: 33 (Shore A); elongation: 287%; tensile strength: 221 psi. Cured samples were used to determine the changes in the physical properties upon exposure at 177° C. and immersion in JRF Type I as well as in Skydrol hydraulic fluid (Skydrol LD-4). The results are presented in Table 1 and Table 2.

TABLE 1

Exposure of Moisture-Cured Sealant II to JRF Type I and Skydrol Fluid (LD-4)
Exposure of Sealant to JRF Type I and Skydrol Fluid (LD-4)

| Exposure | Elongation (%) | Tensile Strength (psi) |
|---|---|---|
| One week in JRF Type I | 208 | 84 |
| 5 days in Skydrol (LD-4) | 400 | Acceptable |

TABLE 2

Exposure of Moisture-Cured Sealant II to 177° C.
Exposure at 177° C.

| Hours at 177° C. | Elongation (%) | Tensile Strength (psi) |
|---|---|---|
| 0 | 287 | 221 |
| 1,000 | 140 | 227 |
| 1500 | 100 | 236 |
| 2,382 | 87 | 244 |

Example 10

Addition-Curable Sealant

A mixture of three fillers, calcium carbonate (2.30 g), red iron oxide (1.33 g) and zinc oxide (1.66 g), were milled into a fine powder. In a separate cup, the olefin intermediate of Example 5 (10.0 g), the silane polymer of Example 4 (2.1 g), and the perfluoroether fluid Demnum™ S-200 (1.21 g) were charged and mixed. Filler was mixed, in three portions, with the polymeric part. Platinum catalyst (0.025 g of 3.28% solution of PC075 in α,α,α-trifluorotoluene) was added. The contents were mixed and spread in a plastic lid (diameter: 2.5 inches). Curing the spread for 4 days at room temperature and then 24 hr at 70° C. provided an elastomeric specimen. The cured specimen lost 1.17% of its original weight after exposure at 135° C. for 2 months.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A moisture-curable composition comprising an alkoxysilane-terminated extended perfluoroether, wherein the alkoxysilane-terminated extended perfluoroether comprises the reaction products of reactants comprising:

(a) an alkenyl-terminated extended perfluoroether, wherein the alkenyl-terminated extended perfluoroether comprises a compound of Formula (1):

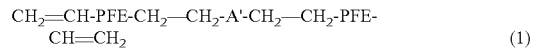
$$CH_2=CH-PFE-CH_2-CH_2-A'-CH_2-CH_2-PFE-CH=CH_2 \quad (1)$$

wherein:
-A'- is a moiety of Formula (2b):

$$(2b)$$

each $R^1$ is independently selected from $C_{1-4}$ alkyl, $C_{5-6}$ cycloalkyl, phenyl, and $-O-Si(R^2)_3$, wherein each $R^2$ is independently $C_{1-4}$ alkyl; and
n is an integer from 1 to 6; and
each $CH_2=CH-PFE-CH_2-CH_2-$ is derived from an alkenyl-terminated perfluoroether $CH_2=CH-PFE-CH=CH_2$, wherein -PFE- comprises perfluoroether groups; and
(b) an alkoxysilane.

2. The moisture-curable composition of claim 1, wherein the alkoxysilane is a compound of Formula (4):

$$H-Si(-R^3)_p(-OR^3)_{3-p} \quad (4)$$

wherein:
p is selected from 0, 1, and 2; and
each $R^3$ is independently selected from $C_{1-4}$ alkyl.

3. The moisture-curable composition of claim 1, comprising an unextended alkoxysilane-terminated perfluoroether of Formula (5):

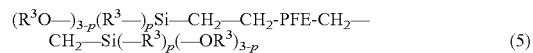
$$(R^3O-)_{3-p}(R^3-)_pSi-CH_2-CH_2-PFE-CH_2-CH_2-Si(-R^3)_p(-OR^3)_{3-p} \quad (5)$$

wherein:
each p is independently selected from 0, 1, and 2;
each $R^3$ is independently selected from $C_{1-4}$ alkyl; and
$-CH_2-CH_2-PFE-CH_2-CH_2-$ is derived from an alkenyl-terminated perfluoroether, $CH_2=CH-PFE-CH=CH_2$, wherein -PFE-comprises perfluoroether groups.

4. The moisture-curable composition of claim 1, formulated as a sealant.

5. An aperture sealed with the moisture-curable composition of claim 4.

6. A method of sealing an aperture, comprising:
(a) applying the moisture-curable composition of claim 4 to one or more surfaces defining an aperture; and
(b) curing the moisture-curable composition of claim 4 to seal the aperture.

7. The moisture-curable composition of claim 1, wherein the alkenyl-terminated perfluoroether comprises perfluoroether groups selected from $-[-CF_2-CF_2-CF_2-O-]_k-$, $-CF_2-O-[-CF_2-CF_2-O-]_k-[-CF_2-]_k-CF_2-$, $-[-CF(CF_3)-CF_2-O-]_k-$, $-[-CF_2-CF(CF_3)-O-]_k-$, and a combination of any of the foregoing, wherein each k is independently an integer from 2 to 100.

8. The moisture-curable composition of claim 1, wherein the alkenyl-terminated perfluoroether comprises a polyfunctional alkenyl-terminated perfluoroether.

9. The moisture-curable composition of claim 1, wherein the alkenyl-terminated perfluoroether comprises a trifunctional alkenyl-terminated perfluoroether.

10. The moisture-curable composition of claim 1, wherein the alkoxysilane-terminated extended perfluoroether is characterized by an average alkoxysilane functionality from 2 to 3.

11. The moisture-curable composition of claim 1, comprising an unextended alkoxysilane-terminated perfluoroether.

12. The moisture-curable composition of claim 11, wherein the unextended alkoxysilane-terminated perfluoroether comprises perfluoroether groups selected from —[—CF$_2$—CF$_2$—CF$_2$—O—]$_k$—, —CF$_2$—O—[—CF$_2$—CF$_2$—O—]$_k$—[—CF$_2$—O—]$_k$—CF$_2$—, —[—CF(CF$_3$)—CF$_2$—O—]$_k$—, —[—CF$_2$—CF(CF$_3$)—O—]$_k$—, and a combination of any of the foregoing, wherein each k is independently an integer from 2 to 100.

13. A moisture-curable composition comprising:
an alkoxysilane-terminated extended perfluoroether; and
an unextended alkoxysilane-terminated perfluoroether of Formula (5):

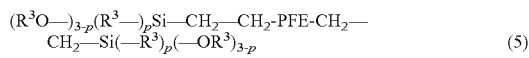  (5)

wherein:
each p is independently selected from 0, 1, and 2;
each R$^3$ is independently selected from C$_{1-4}$ alkyl; and
—CH$_2$—CH$_2$-PFE-CH$_2$—CH$_2$— is derived from an alkenyl-terminated perfluoroether, CH$_2$=CH-PFE-CH=CH$_2$, wherein -PFE- comprises perfluoroether groups.

14. The moisture-curable composition of claim 13, wherein the alkoxysilane-terminated extended perfluoroether comprises a compound of Formula (3):

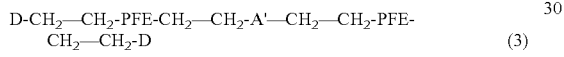  (3)

wherein,
each -D is independently —Si(—R$^3$)$_p$(—OR$^3$)$_{3-p}$, wherein p is independently selected from 0, 1, and 2; and
each R$^3$ is independently selected from C$_{1-4}$ alkyl;
-A'- comprises structure moiety of Formula (2b):

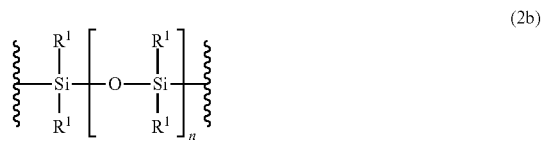  (2b)

wherein,
each R$^1$ is independently selected from C$_{1-4}$ alkyl, C$_{5-6}$ cycloalkyl, phenyl, and —O—Si(R$^2$)$_3$, wherein each R$^2$ is independently C$_{1-4}$ alkyl; and n is an integer from 1 to 6; and
each —CH$_2$—CH$_2$-PFE-CH$_2$—CH$_2$— is derived from an alkenyl-terminated perfluoroether, CH$_2$=CH-PFE-CH=CH$_2$, wherein -PFE- comprises perfluoroether groups.

15. The moisture-curable composition of claim 13, formulated as a sealant.

16. An aperture sealed with the moisture-curable composition of claim 15.

17. A method of sealing an aperture, comprising:
(a) applying the moisture-curable composition of claim 15 to one or more surfaces defining an aperture; and
(b) curing the moisture-curable composition of claim 15 to seal the aperture.

* * * * *